(12) United States Patent
Shreve et al.

(10) Patent No.: US 9,536,153 B2
(45) Date of Patent: Jan. 3, 2017

(54) METHODS AND SYSTEMS FOR GOODS RECEIVED GESTURE RECOGNITION

(71) Applicant: Xerox Corporation, Norwalk, CT (US)

(72) Inventors: Matthew Adam Shreve, Tampa, FL (US); Michael C. Mongeon, Walworth, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 597 days.

(21) Appl. No.: 13/959,195

(22) Filed: Aug. 5, 2013

(65) Prior Publication Data
US 2015/0035975 A1    Feb. 5, 2015

(51) Int. Cl.
H04N 7/18       (2006.01)
G06Q 20/30      (2012.01)
G06T 7/20       (2006.01)
G06K 9/00       (2006.01)

(52) U.S. Cl.
CPC ....... G06K 9/00771 (2013.01); G06K 9/00335 (2013.01); G06Q 20/30 (2013.01); G06T 7/2006 (2013.01); H04N 7/18 (2013.01); H04N 7/181 (2013.01); G06T 2207/20112 (2013.01); G06T 2207/30232 (2013.01)

(58) Field of Classification Search
CPC .. H04N 7/18; G06Q 30/00; G06T 2207/30232
See application file for complete search history.

(56) References Cited

U.S. PATENT DOCUMENTS

| | | | |
|---|---|---|---|
| 5,465,115 A | 11/1995 | Conrad et al. | |
| 5,581,625 A | 12/1996 | Connell | |
| 5,953,055 A | 9/1999 | Huang et al. | |
| 6,195,121 B1 | 2/2001 | Huang et al. | |
| 6,654,047 B2 | 11/2003 | Iizaka | |
| 6,967,674 B1 | 11/2005 | Lausch | |
| 7,688,349 B2 | 3/2010 | Flickner et al. | |
| 8,448,858 B1 * | 5/2013 | Kundu | G07F 17/3241 235/375 |
| 8,577,705 B1 * | 11/2013 | Baboo | G06Q 30/02 705/7.11 |
| 8,833,653 B2 * | 9/2014 | Kundu | G06Q 20/00 235/375 |
| 2007/0253595 A1 * | 11/2007 | Sorensen | G07C 9/00 382/103 |

OTHER PUBLICATIONS

U.S. Appl. No. 13/933,194, Jul. 2, 2013, Mongeon et al.
http://www.agentvi.com/images/Agent_Vi_-_Retail_Applications.pdf, 8 pages.
http://www.scopixsolutions.com/solutions/retail-video-analytics, 2 pages.

(Continued)

Primary Examiner — Michael Teitelbaum
(74) Attorney, Agent, or Firm — Fay Sharpe LLP (57) ABSTRACT

Disclosed are methods and systems to automatically detect and optionally classify when a recipient receives goods in surveillance video. According to one exemplary embodiment, a computer implemented method determines a customer has received goods which are associated with a retail environment.

24 Claims, 7 Drawing Sheets

(56) References Cited

OTHER PUBLICATIONS http://www.retailtouchpoints.com/in-store-insights/714-checking-in-on-minority-report-video-analytics-and-hyper-targeting-in-retail, 5 pages.
http://security.americandynamics.net/blog/bid/58004/Considerations-for-Video-Analytics-in-Retail, 3 pages.
http://rogerioferis.com/publications/FerisAVSS07b.pdf, "Video Analytics for Retail", A. W. Senior et al., Yorktown Heights, NY, 6 pages.
http://www.cisco.com/web/about/ac79/docs/pov/Video_Analytics_NRF_POV_120809_v11.pdf, Video Analytics: enabling Retailers and CAsinos to Build Brand Loyalty, Increase Competitive Advantage, and Improve Customer Servic, Cisco Internet Business Solutions Group, Copyright 2009, 2 pages.
http://www.intelli-vision.com/, Video Analytics & Automated Monitoring for Security and Surveillance, copyright 2013, 2 pages.
http://www.security.honeywell.com/uk/video/documents/VideoAnalytics_Retail_UK.pdf, "Intelligent Video Analytics for: The Retail Applications Market", Honeywell, Sep. 2007, 4 pages.
http://unex.com.tw/product/ivs-200-retail, 6 pages.
http://www.retailsolutionsonline.com/doc.mvc/Real-Value-In-Video-Analytics-0001, "Real Value in Video Analytics?", 2 pages.
http://www.retailtouchpoints.com/retail-store-ops/1230--video-analytics-solutions-help-retailers-optimize-customer-service-and-workforce-management, 6 pages.
http://www.scopixsolutions.com/solutions/improving-customer-engagementm 1 page.
Laptev et al., "Learning realistic human actions from movies", 2008, 8 pages.
Schüldt et al. "Recognizing human actions: A local SVM approach", 2004, 5 pages.
Wang et al., "Evaluation of local spatio-temporal features for action recognition", 2009, 11 pages.
Permuter et al., "Gaussian mixture models of texture and colour for image database retrieval". IEEE International Conference on Acoustics, Speech, and Signal Processing, 2003, 4 pages.

* cited by examiner

METHODS AND SYSTEMS FOR GOODS RECEIVED GESTURE RECOGNITION

CROSS REFERENCE TO RELATED PATENTS AND APPLICATIONS

U.S. Patent Publication No. 2014/0063256, published Mar. 6, 2014, by Michael C. Mongeon et al., and entitled "Queue Group Leader Identification" and U.S. Pat. No. 9,165,194, issued Oct. 20, 2015, by Matthew Adam Shreve et al., and entitled "Heuristic-Based Approach for Automatic Payment Gesture Classification and Detection", are incorporated herein by reference in their entirety.

BACKGROUND

The exemplary embodiment relates generally to the detection of goods received gestures in surveillance video and finds particular application in connection with a system and method which allows for automatic classification and/or detection of goods received gestures in surveillance video.

Technological advancement and increased availability of surveillance technology over the past few decades has enabled companies to perform new tasks with surveillance video. Generally, companies capture and store video footage of retail settings for their own protection and for the security and protection of employees and customers. However, this video footage has uses beyond security and safety, such as its potential for data-mining and estimating consumer behavior and experience. Analysis of video footage may allow for slight improvements in efficiency or customer experience, which in the aggregate can have a large financial impact. Many retailers provide services that are heavily data driven and therefore have an interest in obtaining numerous customer and store metrics, such as queue lengths, experience time both in-store and for drive-through, specific order timing, order accuracy, and customer response.

Several corporations are patenting retail-setting applications for surveillance video beyond well-known security and safety applications. U.S. Pat. No. 5,465,115, issued Nov. 7, 1995, entitled VIDEO TRAFFIC MONITOR FOR RETAIL ESTABLISHMENTS AND THE LIKE, by Conrad et al., counts detected people and records the count according to the direction of movement of the people. U.S. Pat. No. 5,953,055, issued Sep. 14, 1999, entitled SYSTEM AND METHOD FOR DETECTING AND ANALYZING A QUEUE, by Huang et al., U.S. Pat. No. 5,581,625, issued Dec. 3, 1996, entitled STEREO VISION SYSTEM FOR COUNTING ITEMS IN A QUEUE, by Connel, and U.S. Pat. No. 6,195,121, issued Feb. 27, 2001, entitled SYSTEM AND METHOD FOR DETECTING AND ANALYZING A QUEUE, by Huang et. al, each disclose examples of monitoring queues. U.S. Pat. No. 6,654,047, issued Nov. 25, 2003, entitled METHOD OF AND DEVICE FOR ACQUIRING INFORMATION ON A TRAFFIC LINE OF PERSONS, by Lizaka, monitors groups of people within queues. U.S. Pat. No. 7,688,349, issued Mar. 30, 2010, entitled METHOD OF DETECTING AND TRACKING GROUPS OF PEOPLE, by Flickner et al., monitors various behaviors within a reception setting.

While the above-mentioned patents describe data mining applications related to video monitoring, none of them disclose the detection of goods received gestures within a retail or surveillance setting. Data driven retailers are showing increased interest in process-related data from which performance metrics can be extracted. One such performance metric is a customer's total experience time (TET) from which guidelines to improve order efficiency and customer satisfaction can be extracted. While prior art teaches how to estimate important components of the TET estimate such as queue length, no techniques have been disclosed on accurate estimation of goods received detection, which is a key element in TET measurement. Therefore, there is a need for a system and method that automatically detects and/or classifies goods received gestures in surveillance video.

In general, gesture recognition approaches have been based on modeling human movement. Many approaches use local image and video based approaches, as disclosed in LEARNING REALISTIC HUMAN ACTIONS FROM MOVIES, I. Laptev et al. (CVPR 2008), and RECOGNIZING HUMAN ACTIONS: A Local SVM Approach (ICPR 2004), each of these references describing modeling of the human shape during certain action. More recent approaches have employed space-time feature detectors and descriptors, as disclosed in EVALUATION OF LOCAL SPATIO-TEMPORAL FEATURES FOR ACTION RECOGNITION, by H. Wang et al. (BMVC 2009). These gesture recognition based approaches however have not been applied in the context of surveillance video retail applications, from which payment gestures can be detected using the technology disclosed herein.

A system and method for automatically detecting and/or classifying goods received gestures in surveillance video is desired. Successful detection of goods received gestures with a facile and low computational cost algorithm can prove to be an effective measure in aiding recent efforts by retailers to encapsulate a customer's experience through performance metrics. The disclosed methods and system focus on algorithmic processing of a video sequence to provide accurate detection of various goods received gestures at near real-time speeds.

INCORPORATION BY REFERENCE

U.S. Pat. No. 5,465,115, issued Nov. 7, 1995, by Conrad et al., entitled "VIDEO TRAFFIC MONITOR FOR RETAIL ESTABLISHMENTS AND THE LIKE";

U.S. Pat. No. 5,953,055, issued Sep. 14, 1999, by Huang et al., entitled "SYSTEM AND METHOD FOR DETECTING AND ANALYZING A QUEUE";

U.S. Pat. No. 5,581,625, issued Dec. 3, 1996, by Connell, entitled "STEREO VISION SYSTEM FOR COUNTING ITEMS IN A QUEUE";

U.S. Pat. No. 6,195,121, issued Feb. 27, 2001, by Huang et al., entitled "SYSTEM AND METHOD FOR DETECTING AND ANALYZING A QUEUE";

U.S. Pat. No. 6,654,047, issued Nov. 25, 2003, by lizaka, entitled "METHOD OF AND DEVICE FOR ACQUIRING INFORMATION ON A TRAFFIC LINE OF PERSONS";

U.S. Pat. No. 7,688,349, issued Mar. 30, 2010, by Flickner et al., entitled "METHOD OF DETECTING AND TRACKING GROUPS OF PEOPLE";

U.S. Pat. No. 6,967,674, issued Nov. 22, 2005, by Lausch, entitled "METHOD AND DEVICE FOR DETECTING AND ANALYZING THE RECEPTION BEHAVIOR OF PEOPLE";

http://www.agentvi.com/images/Agent_Vi_-_Retail_Applications.pdf, 8 pages;

http://www.scopixsolutions.com/solutions/retail-video-analytics, 2 pages;

http://www.retailtouchpoints.com/in-store-insights/714-checking-in-on-minority-report-video-analytics-and-hyper-targeting-in-retail, 5 pages;

http://security.americandynamics.net/blog/bid/58004/Considerations-for-Video-Analytics-in-Retail, 3 pages;

http://rogerioferis.com/publications/FerisAVSS07b.pdf, "Video Analytics for Retail", A. W. Senior et al., Yorktown Heights, N.Y., 6 pages;

http://www.cisco.com/web/about/ac79/docs/pov/Video_Analytics_NRF_POV_120809_v11.pdf, "Video Analytics: enabling Retailers and Casinos to Build Brand Loyalty, Increase Competitive Advantage, and Improve Customer Service, Cisco Internet Business Solutions Group, Copyright 2009, 2 pages;

http://www.intelli-vision.com/, "Video Analytics & Automated Monitoring for Security and Surveillance, copyright 2013, 2 pages;

http://www.security.honeywell.com/uk/video/docurnents/VideoAnalytics_Retail_UK.pdf, "Intelligent Video Analytics for: The Retail Applications Market", Honeywell, September 2007, 4 pages;

http://unex.com.tw/product/ivs-200-retail, 6 pages;

http://www.retailsolutionsonline.com/doc.mvc/Real-Value-In-Video-Analytics-0001, "Real Value in Video Analytics?", 2 pages;

http://www.retailtouchpoints.com/retail-store-ops/1230-video-analytics-solutions-help-retailers-optimize-customer-service-and-workforce-management, 6 pages;

http://www.scopixsolutions.com/solutions/irnproving-customer-engagementm 1 page;

Laptev et al., "Learning realistic human actions from movies", 2008, 8 pages;

Schüldt et al. "Recognizing human actions: A local SVM approach", 2004, 5 pages;

Wang et al., "Evaluation of local spatio-temporal features for action recognition", 2009, 11 pages; and Permuter et al., "Gaussian mixture models of texture and colour for image database retrieval". IEEE International Conference on Acoustics, Speech, and Signal Processing, 2003, 4 pages, are all incorporated herein by reference in their entirety.

BRIEF DESCRIPTION

In one embodiment of this disclosure, described is a computer implemented method of determining a customer has received one or more goods which are associated with a retail environment, the method comprising: a) acquiring a surveillance video sequence using at least one video camera, the video camera oriented to include a field of view associated with a goods receiving area of the retail environment where the one or more goods are to be received by the customer; b) processing the video sequence to detect motion representative of the one or more goods being placed in the goods receiving area by a provider of the one or more goods; c) processing the video sequence to track within the goods receiving area the one or more goods detected in step b); d) processing the video sequence to identify the customer associated with receiving the one or more goods detected in step b); e) processing the video sequence to determine the customer identified in step d) has received the one or more goods detected in step b).

In another embodiment of this disclosure, described is an image capturing system comprising: an image capturing device; and an image processor operatively associated with the image capturing device, the image processor configured to perform a method of detecting a customer receiving one or more goods associated with a retail environment, the method comprising: a) acquiring a surveillance video sequence using at least one video camera, the video camera oriented to include a field of view associated with a goods receiving area of the retail environment where the one or more goods are to be received by the customer; b) processing the video sequence to detect motion representative of the one or more goods being placed in the goods receiving area by a provider of the one or more goods; c) processing the video sequence to track within the goods receiving area the one or more goods detected in step b); d) processing the video sequence to identify the customer associated with receiving the one or more goods detected in step b); e) processing the video sequence to determine the customer has received the one or more goods detected in step b).

In still another embodiment of this disclosure, described is a computer implemented method of detecting a recipient has received one or more goods, the method comprising: aa) acquiring a surveillance video using at least one video camera, the video camera oriented to include a field of view associated with a goods receiving area where the one or more goods are to be received by the recipient; bb) processing the surveillance video to detect the one or more goods being placed in the goods receiving area by a provider of the one or more goods; cc) processing the surveillance video to track within the goods receiving area the one or more goods detected in step bb); dd) processing the surveillance video to identify the recipient associated with receiving the one or more goods detected in step bb); and ee) processing the surveillance video to determine the recipient identified in step dd) has received the one or more goods detected in step bb).

DETAILED DESCRIPTION

This disclosure and the exemplary embodiments disclosed herein relates to methods and systems that automatically detect when a customer receives goods from an overhead video camera in a hand-off, counter or table configuration, according to an exemplary embodiment. The method is mainly based on motion analysis within predetermined regions-of-interest (ROI) together with goods identification and tracking.

As discussed in the background section, modern retail processes are becoming heavily data driven, and retailers therefore have a strong interest in numerous customer and store metrics such as queue lengths, experience time in-store and drive-through, specific order timing, order accuracy, and customer response. Event timing is currently established with some manual entry (sale) or "bump bar," which is commonly being cheated by employees that "bump early." Other events many not currently be detected at all.

The present disclosure teaches a method and system that automatically detects and classifies when a customer receives goods in surveillance video. The method described herein consists of several steps in processing the video sequence: (1) Optical flow is used to estimate motion in a video stream; (2) a binary image corresponding to the foreground and background associated with the video stream is created using a dynamic background model; (3) Both the optical flow and the binary image are then segmented into Regions of Interest (ROI's); and (4) Motion and background characteristics are measured within each ROI to determine the occurrence of goods on the counter and the retrieval of such goods from a customer. It is an algorithmic method that does not require any special equipment except a webcam or other surveillance camera that has an over-head view of a payment counter.

Specifically, the present disclosure discloses a method that automatically recognizes when a customer receives his/her goods using two Regions of Interest (ROI's) in conjunction with motion detection (e.g., optical flow) and background modeling. An exemplary method consists of the following steps:

Step 1) From the video stream, acquire a video frame without a customer, cashier, or goods present and initialize this frame as the background.

Step 2) Acquire a subsequent sequential pair of frames from the video stream and estimate the presence of motion using estimation techniques such as optical flow to obtain a motion vector for each pixel, or some subset of pixels in the image pair. If no motion is detected in these frames, it can be beneficial to update the background model with the current frame to account for changes in setting (lighting, camera movement, . . . ).

Step 3) Use background subtraction and thresholding to segment the foreground from the background, creating a binary image. The foreground is associated with the pixel regions that were estimated to possess motion.

Step 4) Detect the sub-event of placing goods on the counter within the Goods ROI (ROI1).

Step 5) Detect the sub-event of a customer reaching towards the goods within the Customer ROI (ROI2).

Step 6) If motion is detected in ROI1, find any objects within ROI1 using the binary image generated from the background subtraction and thresholding.

Step 7) For each object found, if the characteristics of the object are statistically similar to a goods object, then track this object.

Step 8) If motion is detected on the customer side of the table (ROI2) that is toward the tracked object, indicate a customer state to active (set customer flag=true).

Step 9) If the tracked object is detected as removed from the customer's side of the table, then the "goods received" event is detected.

Step 10) Repeat steps 2)-9) until end of video stream.

Figure 1:
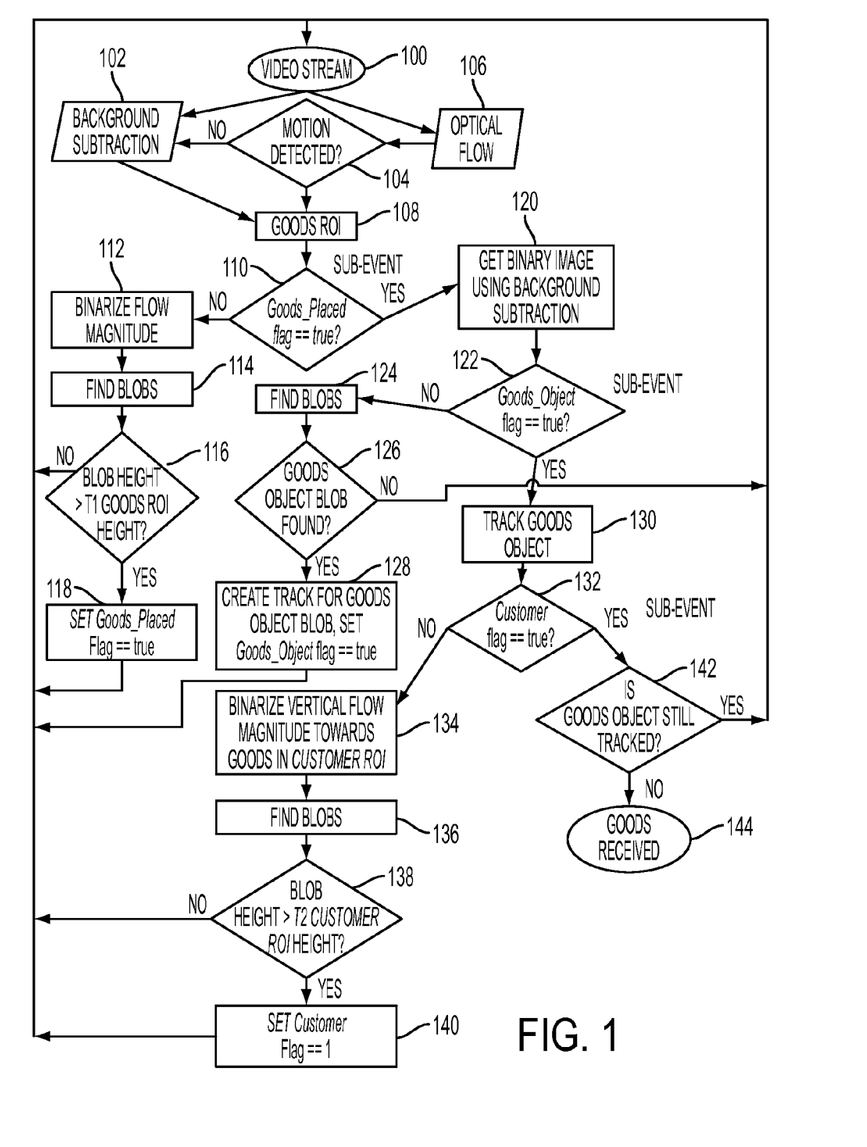
FIG. 1 is a flow chart of a computer-implemented method of determining a customer has received one or more goods associated with a retail environment according to an exemplary embodiment of this disclosure.

With reference to FIG. 1, described now is a detailed exemplary algorithm flow chart of a method of determining a customer has received one or more goods which are associated with a retail environment. FIG. 1, as well as the supporting description, provides one example of implementing previously described step 1) to step 10).

Initially, at block 108, a video stream is acquired.

Next, Background Subtraction block 102 and Optical Flow block 106 process the acquired video stream.

If Optical Flow block 106 detects motion in the acquired video stream, block 104 advances the algorithm to Goods ROI block 108, otherwise, Background Subtraction block 102 is potentially updated with current video representative of the background.

At block 110, the algorithm determines if Goods have been placed in the Goods ROI. If Goods Placed==true? is no, blocks 112, 114, 116 and 118 are executed to determine if Goods have been placed in the Goods ROI, i.e. Goods Placed flag=true.

The algorithm to detect the sub-event of Goods Placed includes the following:

Block 112 binarizes the optical flow magnitude;

Block 114 finds blobs associated with the binarized optical magnitude;

Block 116 determines if the height of any detected blobs exceed a threshold T1, representative of a pixel height associated with Goods within the Goods ROI. If a detected blob exceeds threshold T1, the Goods-Placed is set to true, otherwise the algorithm returns to block 100 to process the video stream as previously described, looking for motion, then Goods placed within the Goods ROI.

After block 110 determines Goods have been placed in the Goods ROI, the algorithm advances to block 120 and acquires/generates a binary image of the foreground using background subtraction.

Blocks 122, 124, 126 and 128 are associated with applying heuristics to a detected blob to determine if characteristic of the blob are consistent with a Goods Object and tracking the Goods Object blob associated with the Goods Placed flag Object blob.

Block 122 determines if the detected Goods which were placed in the Goods ROI have been previously indicated as a Goods Object to be tracked. If yes, the algorithm advances to block 130 to track the Goods Object at block 130. Otherwise, the algorithm advances to block 124.

Block 124 finds blobs included in the binary image generated/acquired in block 120.

Block 126 applies heuristics to determine if the blobs found in block 124 are characteristic of a Goods Object. If the blob is not characteristic of a Goods Object, the algorithm returns to block 100. If the blob is characteristic of a Goods Object, the algorithm proceeds to block 128.

Block 128 creates a track for the Goods Object Blob and Sets Goods_Object flag=true.

As previously described, during the execution of block 122, if the Goods_Object flag is set to true, the algorithm advances to block 130 to track the Goods Object and the algorithm further advances to block 132.

Block 132 determines if Customer flag==true, indicating a customer has previously been associated with a Goods Object. If the customer flag is set to true, the algorithm advances to block 142, otherwise, the algorithm advances to block 134 to begin processing image data to find a customer associated with the placed Goods Object which is being tracked.

Block 134 binarizes the vertical flow magnitude towards the Goods Object being tracked.

Block 136 processes the output of block 134 to detect any blobs.

Block 138 determines if any blobs detected in block 136 have a height greater than a threshold T2 within the Customer ROI. If a blob is not greater than T2, the algorithm returns to block 100. If a blob is greater than T2, indicating a Customer in motion towards the Goods Object has been detected, within the Customer ROI, then the algorithm advances to block 140 and sets Customer Flag=1.

As previously described, at block 132, if Customer Flag=true, then the algorithm advances to block 142.

At block 142, the algorithm determines if the Goods Object is still being tracked, indicating a Goods Object is in the goods receiving area and a customer has been detected moving towards the Goods Object, then the algorithm returns to block 100. If block 142 determines the Goods Object is no longer being tracked, indicating the Goods Object is no longer in the goods receiving area, the algorithm advances to block 144 and deduces the Goods Object has been received by the customer.

A further description of the disclosed subject matter is provided below which includes details of a specific embodiment and implementation of a Goods Received Gesture Recognition Method and System to facilitate a further understanding.

Figure 2:
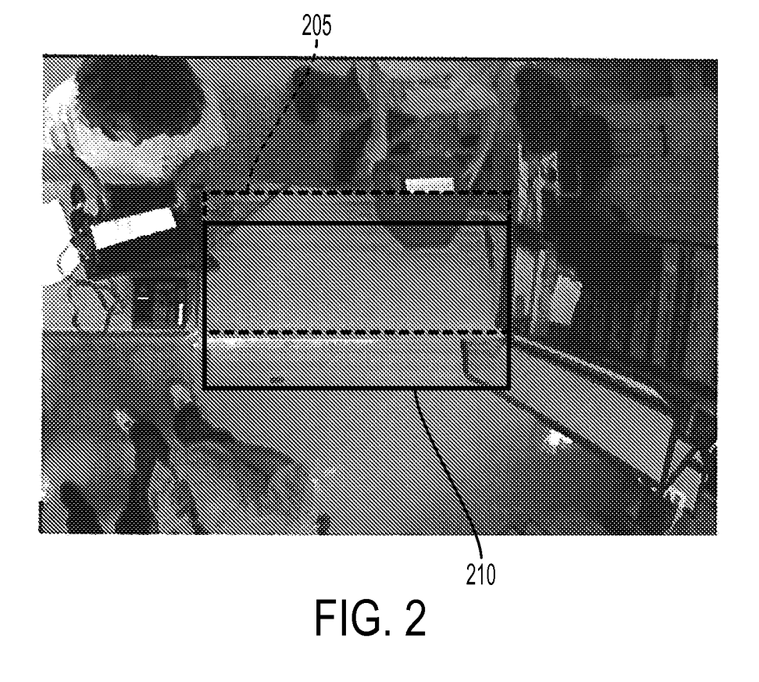
FIG. 2 is an example of a video frame including a Goods ROI (Region of Interest) and Customer ROI according to an exemplary embodiment of this disclosure.

In order to best simulate a real-world setting, several participants formed a queue at a counter with cameras placed above a cashiers table. Participants simulated the purchase of a food product using imitation credit cards or by handing a certificate to a cashier. Customers waited for 2-3 minutes in line, and then picked up their goods from the counter. FIG. 2 is a sample of video captured where the Goods ROI is represented as reference character 205 and the Customer ROI is represented as reference character 210.

Video Stream and Background Acquisition.

Video was captured with a Mobotix Q24 Hemispheric camera. It was placed above the payment counter, directed downward, and recorded using a standard resolution at roughly 12 frames per second. Also, during the initialization of the video stream, the following flags: Goods_Placed, Goods_Object, and Customer_Flag were each set to false. and thresholds T1 and T2 were set in the range of [0.7, 0.8].

From the video stream, a frame without a customer, cashier, or goods present was acquired and used as an initial background BG model.

Motion Estimation.

Motion was estimated using a dense optical flow method, a standard computer vision technique that tracks all pixels between a pair of frames. The motion is represented as a matrix of vectors (uv), where each element uv(x,y) gives the horizontal and vertical motion (u,v) observed at pixel x,y. The Matlab implementation of the Horne-Schunck method was used; however other motion estimation algorithms can be used, such as Lucas-Kanade and Block flow. The flow magnitude can then be calculated by $|uv(x,y)|=\sqrt{u^2+v^2}$. By thresholding this motion magnitude in the Goods ROI, a binary image BI1 is obtained. If BI1 contains blobs that are over T1, the height of Goods ROI, then the flag Placed_Goods is set to true. If the Placed_Goods and Goods_Object flags are both true, then the vertical flow (v component) is thresholded to generate another binary image BI2. If the blobs found in BI2 are greater than T2 of the Customer ROI, then the Customer flag is set to true.

Background Model and Background Subtraction.

A dynamic background model, which is a current image frame estimate of a no-motion-no-goods state, is used that is updated based on motion (or lack thereof) found around the counter region. In our specific implement, if the motion found in ROI2 is less than a threshold for more than 5 consecutive frames, the background model is updated and set to the current frame. More precisely, if $$\sum_{ROI2} |uv| < T_{BG}$$

where $T_{BG}$ is the maximum amount of total motion, for five frames. Alternatively, the background model could be generated that using a mixture model such as mixtures of Gaussians (MoG) (see Permuter et al., "Gaussian mixture models of texture and colour for image database retrieval").

For each frame in the video stream, a binary image Ibin(x,y) is generated that segments the background from the foreground using the following background subtraction technique:

$$I_{bin}(x, y) = \begin{cases} 1 & I(x, y) - BG(x, y) > T_{Bin} \\ 0 & \text{otherwise} \end{cases}$$

where I(x,y) is the current frame in grayscale form, and $T_{Bin}$ is a threshold between 0 and 255, typically in the range of (0, 15).

Goods ROI.

Figure 3:
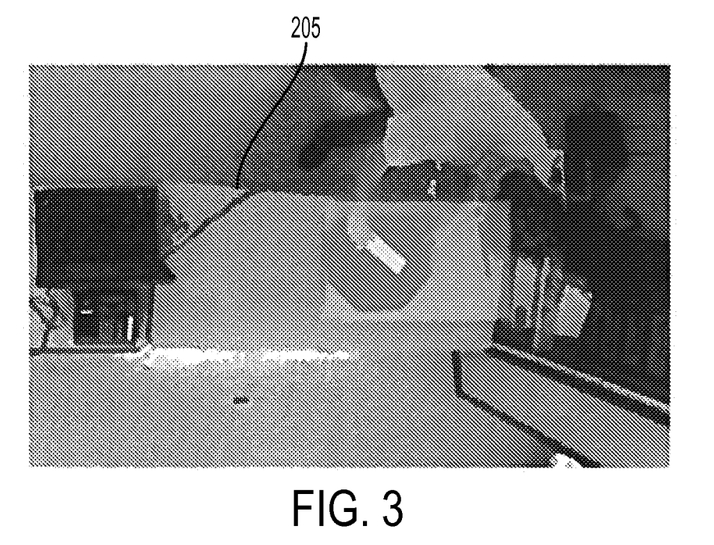
FIG. 3 is an example of a video frame including a provider placing goods on a table according to an exemplary embodiment of this disclosure.
Figure 4:
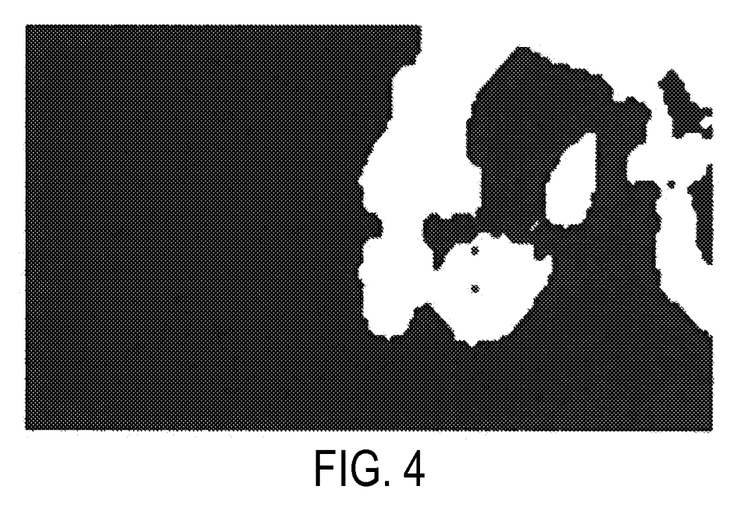
FIG. 4 shows a binarized flow magnitude associated with the video frame illustrated in FIG. 4.

After the background model is obtained, the Goods ROI (ROI2) is then analyzed. The first step is to check if goods have already been placed within the Goods ROI by checking the Goods_Placed flag. If no goods have been placed, then nothing is done until motion is detected within this region. This is determined by thresholding the flow magnitude in the Goods ROI, and finding blobs with a height greater than T1 of the height of the Goods ROI. When this happens, the Goods_Placed Flag is set to true. Otherwise, the processing on this frame of the video stream is complete, and the next frame in the video stream is processed. See FIGS. 3 and 4 for example detection, where FIG. 3 is a video frame including goods being placed within the Goods ROI and FIG. 4 is a binarized image of FIG. 3 including thresholded flow magnitude.

Figure 5:
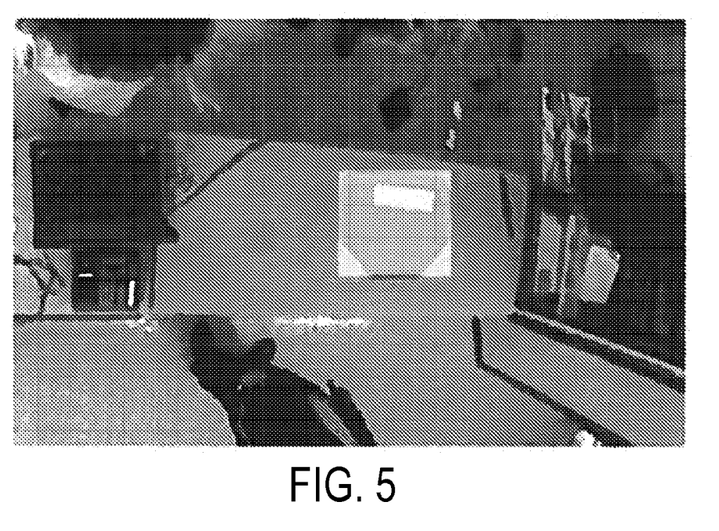
FIG. 5 is an example of a video frame including a goods object that is tracked on a table according to an exemplary embodiment of this disclosure.
Figure 6:
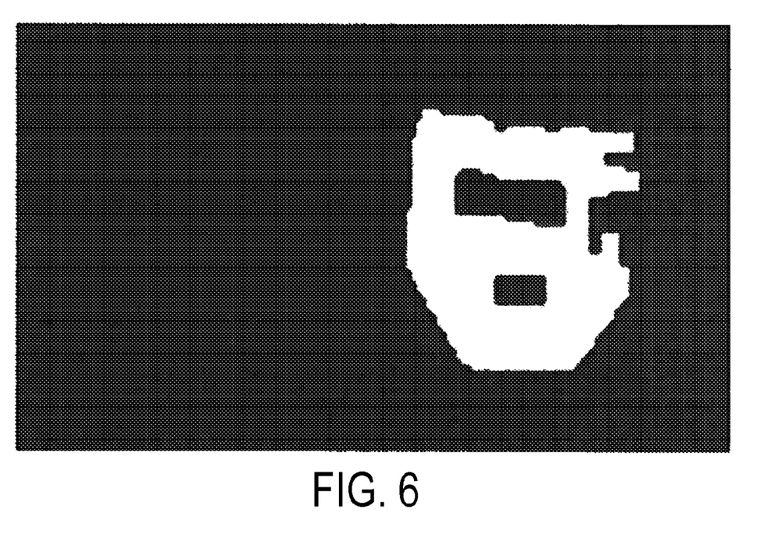
FIG. 6 shows a binarized image of the goods object tracked in FIG. 5, the binarized image generated using background subtraction according to an exemplary embodiment of this disclosure.

When the Goods_Placed flag is true, a binary image is then generated using a background subtraction technique. This binary image is then processed differently depending on the value of the Goods_Object flag. If the Goods_Object flag is false, then the binary image is checked for having blobs that fit the statistical priors of a goods object (such as height and width). Alternatively, specific features of the object can be tracked such as the color histogram, histogram of gradients, local binary patterns, chain codes, density, horizontal and vertical projections. If a blob is found that correlates with a goods object, then a track is created for this blob which will allow it to be tracked until it is removed from the Goods ROI. See FIGS. 5 and 6, where FIG. 5 is video showing a placed Good within the Goods ROI and FIG. 6 is a binary image of the placed Good including a blob correlating with a Goods Object.

Figure 7:
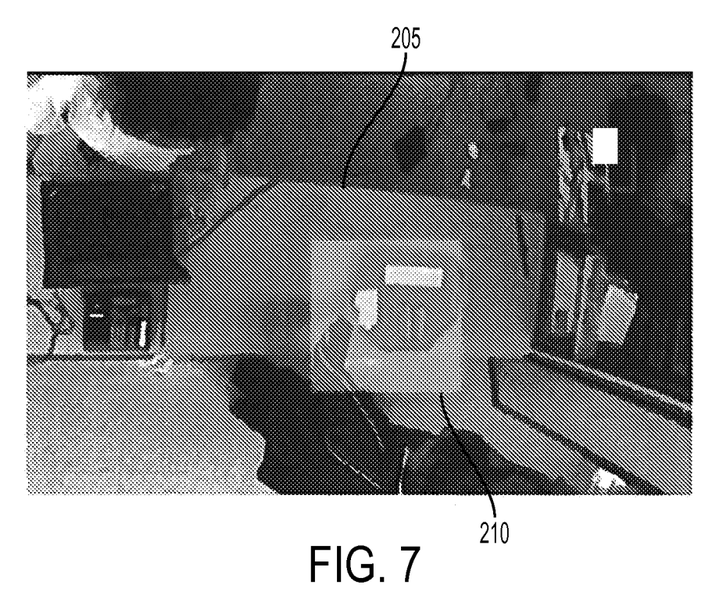
FIG. 7 is an example of a video frame including a goods object being received by a customer within a Customer ROI according to an exemplary embodiment of this disclosure.
Figure 8:
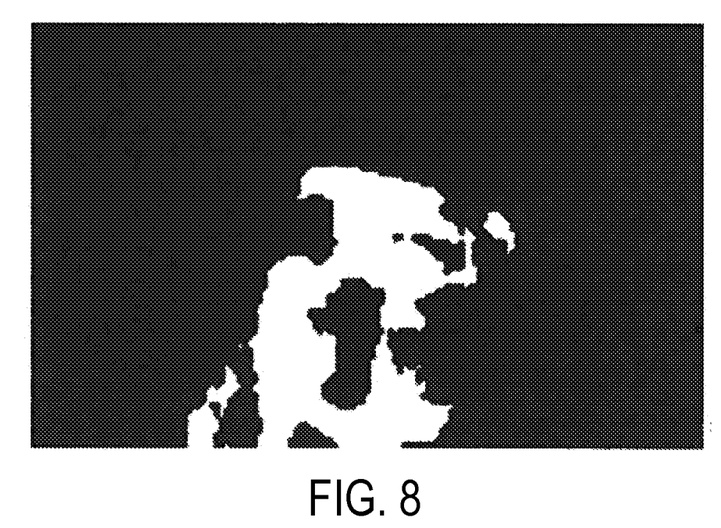
FIG. 8 shows a binarized optical flow magnitude image associated with the customer ROI shown in FIG. 8.

If the Goods_Object flag is true, then first the goods object is tracked. Then the algorithm checks to see if there has been motion from a customer towards the goods object by checking the Customer flag. If the Customer flag is false, then the motion found in the Customer ROI is binarized by thresholding the magnitude of the motion that is generated towards the tracked goods object. The height of any found blobs are then checked to see if any are greater than T2 of the height of the Customer ROI height. If true, then the Customer flag is set to true (see FIGS. 7 and 8).

If the Customer flag is true, then the algorithm checks to see if the goods object has been removed. If so, then the "Goods Received" event is detected.

Figure 9:
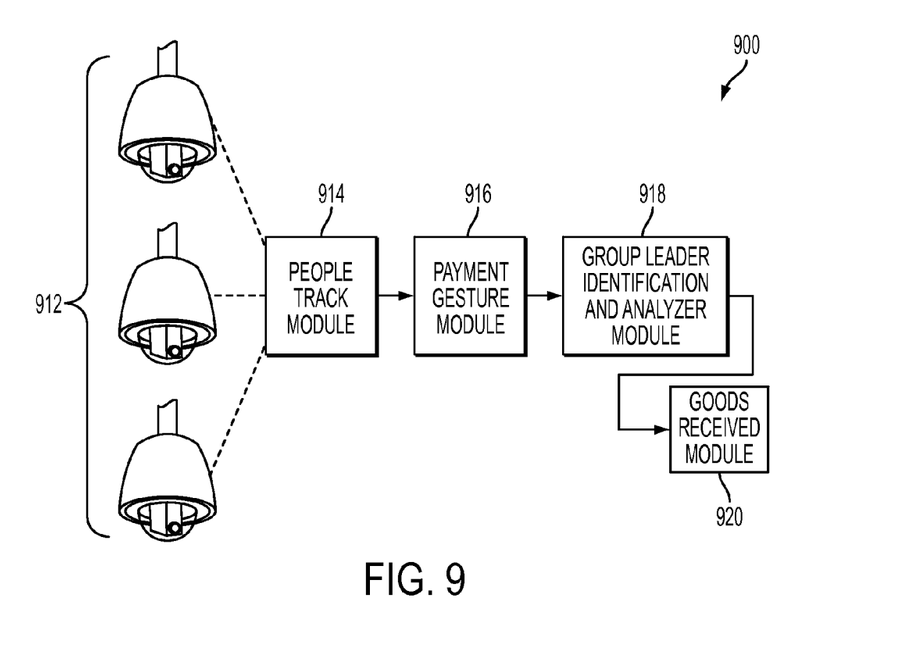
FIG. 9 is a block diagram of a goods received gesture recognition system including a total experience time generation process according to an exemplary embodiment of this disclosure.

With reference to FIG. 9, a system 900 in accordance with the present disclosure is provided which comprises a plurality of modules, illustrated schematically in FIG. 9. The system 900 includes a video capture module 912 that acquires visual data (e.g., video frames or image frames) of customer space, such as a retail establishment, restaurant, etc. The video capture module is illustrated as a plurality of cameras, which may be surveillance cameras or the like. A people track module 914 receives the visual data from the cameras and both identifies individuals within the customer space and tracks the identified individuals as they move within the space. For example, a family may enter the customer space and walk to a counter to place a food order (or any other type of transaction), then proceed to a dining table or other location to dine (or other location to await service). A payment gesture module 916 identifies an individual making a payment gesture such as swiping a credit card, handing over cash, etc. A group leader identification and analyzer module 918 utilizes information from both the people track module 914 and the payment gesture module 916 to identify a leader of a group of individuals in the customer space based upon the individual within the group making the payment gesture. Module 918 then analyzes the visual data to determine the timing of events relative to the group leader such as the length of time the group leader is in the customer space before the payment gesture, the amount of time the group leader remains in the customer space after a payment gesture, etc. Module 920 determines the event of a customer, i.e. group leader, receiving goods purchased which can be used to trigger the completion of a transaction and used to calculate a total experience time metric. Other details can be ascertained such as the order in which the group entered the customer space relative to the group leader, whether the group leader remains in the customer space after the payment gesture or departs the customer space leaving at least some of the members of the group in the customer space. All of this information can be used to enhance customer experience by better understanding how customers move and interact within the customer space.

In an exemplary embodiment, the video capture module 912 can comprise at least one surveillance camera that captures video of an area including the ROI. No special requirements in terms of spatial or temporal resolutions are needed for most applications. Traditional surveillance cameras are typically IP cameras with pixel resolutions of VGA (640×480) and above and frame rates of 15 fps and above. Such cameras are generally well-suited for this application. Higher resolution cameras can also be utilized, as well as cameras having other capabilities such as IR and thermal imaging cameras, for example.

Figure 10:
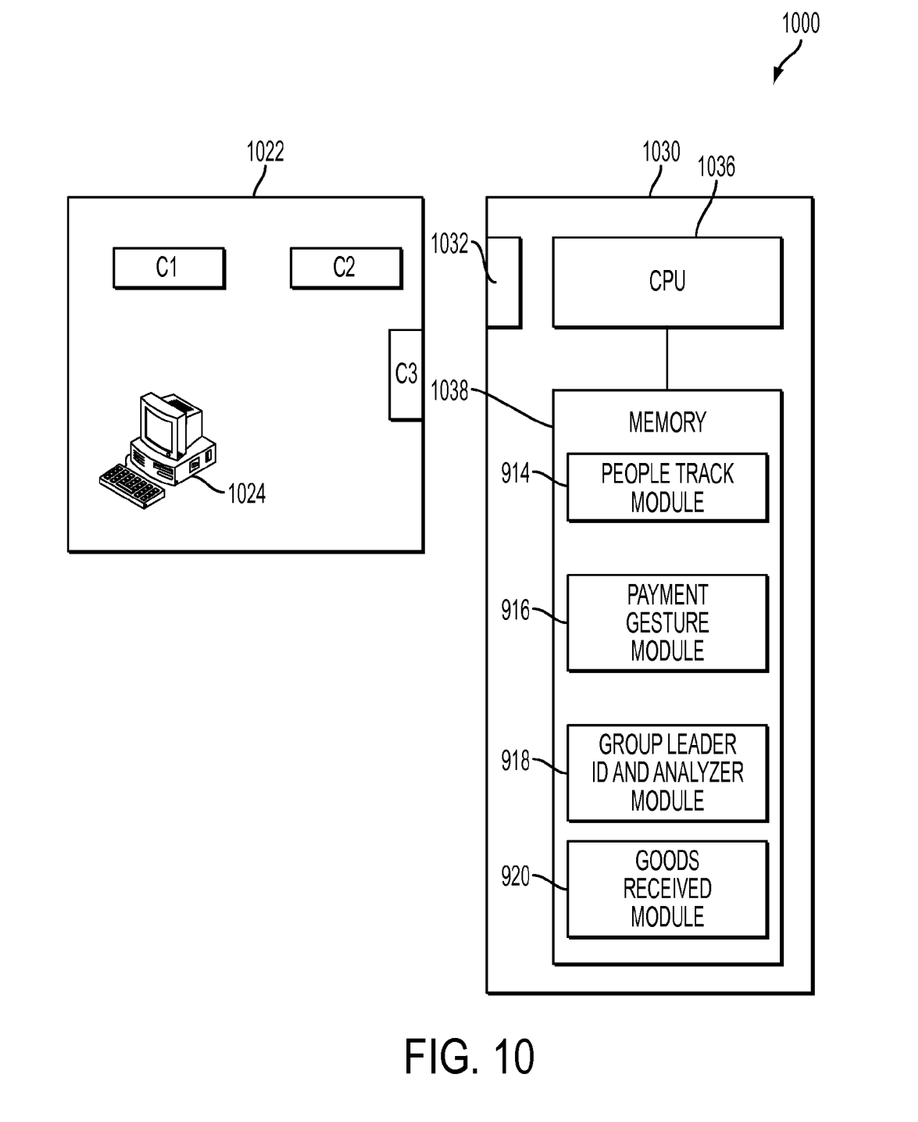
FIG. 10 is another block diagram of a goods received gesture recognition system including a People Track Module, a Payment Gesture Module and a Group Leader ID module according to an exemplary embodiment of this disclosure.

In FIG. 10, an exemplary system 1000 is illustrated in block diagram form in connection with a customer space 1022. It will be appreciated that video capture module 912 is shown as a plurality of cameras C1, C2 and C3. At least one of cameras C1 or C2 is an overhead camera adapted to view a payment station, such as the region about a cash register 1024 or card reader, from overhead to detect payment gestures. An exemplary method and device for detecting payment gestures is set forth in U.S. Provisional Application Ser. No. 61/694,650, filed Aug. 29, 20912, which is hereby incorporated herein by reference in its entirety.

The cameras C1, C2 and C3 are connected to a computer 1030 and supply visual data comprising one or more image frames thereto via a communication interface 1032. It will be appreciated that the computer 1030 can be a standalone unit configured specifically to perform the tasks associated with the aspects of this disclosure. In other embodiments, aspects of the disclosure can be integrated into existing systems, computers, etc. The communication interface 1032 can be a wireless or wired communication interface depending on the application. The computer 1030 further includes a central processing unit 1036 coupled with a memory 1038. Stored in the memory 1038 are the people track module 914, the payment gesture module 916, the group identification and analyzer module 918, and the goods received module 920. Visual data received from the cameras C1, C2 and C3 can be stored in memory 1038 for processing by the CPU 1036 in accordance with this disclosure.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of determining a customer has received one or more goods which are associated with a retail environment, the method comprising:
    a) acquiring a surveillance video sequence using at least one video camera, the video camera oriented to include a field of view associated with a goods receiving area of the retail environment where the one or more goods are to be received by the customer;
    b) processing the video sequence to detect motion representative of the one or more goods being placed in the goods receiving area by a retail environment employee;
    c) processing the video sequence to track within the goods receiving area the one or more goods detected in step b);
    d) processing the video sequence to detect the customer associated with receiving the one or more goods detected in step b);
    e) processing the video sequence to determine the customer detected in step d) has received the one or more goods detected in step b);
    wherein a Goods ROI (Region of Interest) is associated with the goods receiving area and a Customer ROI is associated with the goods receiving area, the Goods ROI including an area where the one or more goods are placed by the retail environment employee, the Customer ROI including an area where the customer receives the one or more goods, and the Goods ROI and Customer ROI overlap and include areas exclusive to the other ROI.

2. The computer implemented method according to claim 1, step b) comprising:
    processing the video sequence using background substraction and thresholding to segment a foreground from a background to create a binary image, the foreground associated with pixel regions estimated to include the motion representative of the one or more goods being placed in the goods receiving area by the retail environment employee.

3. The computer implemented method according to claim 2, wherein one of a dynamic background model, a fixed background model and a background model generated using a mixture model is used to perform the background substraction.

4. The computer implemented method of claim 1, wherein
    step b) processes the video sequence to detect motion representative of the one or more goods being placed by the retail environment employee within the Goods ROI;
    step c) processes the video sequence to track within the Goods ROI the one or more goods detected in step b); and
    step d) processes the video sequence to detect the customer within the Customer ROI associated with the one or more goods detected in step b).

5. The computer implemented method according to claim 1, wherein step b) includes:
    processing the video sequence to detect blobs of pixels representative of one or more goods being placed in the goods receiving area by the retail environment employee; and
    applying heuristic rules to the detected blobs to determine if a characteristic of the detected blob is associated with an object characteristic of the one or more goods received by the customer.

6. The computer implemented method according to claim 1, wherein step d) processes the video sequence to detect the customer associated with the one or more goods detected in step b) by determining customer movement towards the one or more goods tracked in step c).

7. The computer implemented method according to claim 1, wherein step e) determines the customer has received the one or more goods detected in step b) when the one or more goods is no longer detected in the goods receiving area and/or no longer being tracked in the goods receiving area.

8. The computer implemented method according to claim 1, wherein motion is estimated using an optical flow method including one of a Horn-Schunck method, a Lucas-Kanade method and a block flow method.

9. The computer implemented method according to claim 1, further comprising:

f) determining a Total Experience Time of the customer based in part on the step e) determination the customer has received the one or more goods.

10. An image capturing system comprising:
    an image capturing device; and
    an image processor operatively associated with the image capturing device, the image processor configured to perform a method of detecting a customer receiving one or more goods associated with a retail environment, the method comprising:
    a) acquiring a surveillance video sequence using at least one video camera, the video camera oriented to include a field of view associated with a goods receiving area of the retail environment where the one or more goods are to be received by the customer;
    b) processing the video sequence to detect motion representative of the one or more goods being placed in the goods receiving area by a retail environment employee;
    c) processing the video sequence to track within the goods receiving area the one or more goods detected in step b);
    d) processing the video sequence to detect the customer associated with receiving the one or more goods detected in step b);
    e) processing the video sequence to determine the customer detected in step d) has received the one or more goods detected in step b);
    wherein a Goods ROI (Region of Interest) is associated with the goods receiving area and a Customer ROI is associated with the goods receiving area, the Goods ROI including an area where the one or more goods are placed by the retail environment employee, the Customer ROI including an area where the customer receives the one or more goods, and the Goods ROI and Customer ROI overlap and include areas exclusive to the other ROI.

11. The image capturing system according to claim 10, step b) comprising:
    processing the video sequence using background substraction and thresholding to segment a foreground from a background to create a binary image, the foreground associated with pixel regions estimated to include the motion representative of the one or more goods being placed in the goods receiving area by the retail environment employee.

12. The image capturing system according to claim 11, wherein one of a dynamic background model, a fixed background model and a background model generated using a mixture model is used to perform the background substraction.

13. The image capturing system according to clam 10, wherein a Goods ROI (Region of Interest) is associated with the goods receiving area and a customer ROI is associated with the goods receiving area, the Goods ROI including an area where the one or more goods are placed by the retail environment employee and the Customer ROI including an area where the customer receives the one or more goods,
    step b) processes the video sequence to detect motion representative of the one or more goods being placed by the provider within the Goods ROI;
    step c) processes the video sequence to track within the Goods ROI the one or more goods detected in step b); and
    step d) processes the video sequence to detect the customer within the Customer ROI associated with the one or more goods detected in step b).

14. The image capturing system according to claim 13, wherein the Goods ROI and Customer ROI overlap and include areas exclusive to the other ROI.

15. The image capturing system according to claim 10, wherein step b) includes:
    processing the video sequence to detect blobs of pixels representative of one or more goods being placed in the goods receiving area by the retail environment employee; and
    applying heuristic rules to the detected blobs to determine if a characteristic of the detected blob is associated with an object characteristic of the one or more goods received by the customer.

16. The image capturing system according to claim 10, wherein step d) processes the video sequence to identify the customer associated with the one or more goods detected in step b) by determining customer movement towards the one or more goods tracked in step c).

17. The image capturing system according to claim 10, wherein step e) determines the customer has received the one or more goods detected in step b) when the one or more goods is no longer detected in the goods receiving area and/or no longer being tracked in the goods receiving area.

18. The image capturing system according to claim 10, wherein motion is estimated using an optical flow method including one of a Horn-Schunck method, a Lucas-Kanade method and a block flow method.

19. The image capturing system according to claim 10, the method further comprising:
    f) determining a Total Experience Time of the customer based in part on the step e) determination the customer has received the one or more goods.

20. A computer implemented method of detecting a recipient has received one or more goods, the method comprising:
    aa) acquiring a surveillance video using at least one video camera, the video camera oriented to include a field of view associated with a goods receiving area where the one or more goods are to be received by the recipient;
    bb) processing the surveillance video to detect the one or more goods being placed in the goods receiving area by a retail environment employee;
    cc) processing the surveillance video to track within the goods receiving area the one or more goods detected in step bb);
    dd) processing the surveillance video to detect the recipient associated with receiving the one or more goods detected in step bb); and
    ee) processing the surveillance video to determine the recipient detected in step dd) has received the one or more goods detected in step bb);
    wherein a Goods ROI (Region of Interest) is associated with the goods receiving area and a Customer ROI is associated with the goods receiving area, the Goods ROI including an area where the one or more goods are placed by the retail environment employee, the Customer ROI including an area where the customer receives the one or more goods, and the Goods ROI and Customer ROI overlap and include areas exclusive to the other ROI.

21. The computer implemented method according to claim 20, wherein a Goods ROI (Region of Interest) is associated with the goods receiving area and a Recipient ROI is associated with the goods receiving area, the Goods ROI including an area where the one or more goods are placed by the retail environment employee and the Recipient ROI including an area where the customer receives the one or more goods, step bb) processes the video sequence to detect motion representative of the one or more goods being placed by the retail environment employee within the Goods ROI;

step cc) processes the video sequence to track within the Goods ROI the one or more goods detected in step b); and step dd) processes the video sequence to detect the recipient within the Recipient ROI associated with the one or more goods detected in step b).

22. The computer implemented method according to claim 21, wherein the Goods ROI and Recipient ROI overlap and include areas exclusive to the other ROI.

23. The computer implemented method according to claim 20, wherein step ee) determines the recipient has received the one or more goods detected in step bb) when the one or more goods is no longer detected in the goods receiving area and/or no longer being tracked in the goods receiving area.

24. The computer implemented method according to claim 20, wherein step bb) includes:

processing the video sequence to detect blobs of pixels representative of one or more goods being placed in the goods receiving area by the retail environment employee; and applying heuristic rules to the detected blobs to determine if a characteristic of the detected blob is associated with an object characteristic of the one or more goods received by the customer.

\* \* \* \* \*